United States Patent [19]

Bardell, Jr.

[11] Patent Number: 4,959,832
[45] Date of Patent: Sep. 25, 1990

[54] PARALLEL PSEUDORANDOM PATTERN GENERATOR WITH VARYING PHASE SHIFT

[75] Inventor: Paul H. Bardell, Jr., Carmel, N.Y.

[73] Assignee: International Business Machines, Armonk, N.Y.

[21] Appl. No.: 281,617

[22] Filed: Dec. 9, 1988

[51] Int. Cl.$^5$ .............................................. G06F 11/00
[52] U.S. Cl. ....................................... 371/27; 364/717
[58] Field of Search ................... 371/27, 22.3, 22.4, 371/22.5; 364/717; 324/73 R, 73 AT, 73 A

[56] References Cited

U.S. PATENT DOCUMENTS

| | | | |
|---|---|---|---|
| 3,986,168 | 10/1976 | Anderson | 371/27 |
| 3,988,538 | 10/1976 | Patten | 178/22 |
| 4,023,026 | 5/1977 | O'Farrell | 364/717 |
| 4,320,513 | 3/1982 | Lampert | 364/717 X |
| 4,340,857 | 7/1982 | Fasang | 371/22.5 |
| 4,571,556 | 2/1986 | Gnerlich | 364/717 X |
| 4,769,777 | 9/1988 | Bittle et al. | 364/717 |
| 4,771,429 | 9/1988 | Davis et al. | 371/27 |
| 4,775,977 | 10/1988 | Dehara | 371/27 |
| 4,839,841 | 6/1989 | Hagen et al. | 364/717 |
| 4,852,023 | 7/1989 | Lee et al. | 364/717 |
| 4,860,236 | 8/1989 | McLeod et al. | 364/717 |
| 4,864,525 | 9/1989 | Kurihara et al. | 364/717 |

OTHER PUBLICATIONS

P. Beaven, "Diagnostic Instruction for Microprocessors", IBMTDB, pp. 4628–4629, 4/1978.
IBM Technical Report TR00.3451, entitled "Minimum Two-Way Exclusive-OR Realization of LFSRs" by P. H. Bardell, May 6, 1987.

Primary Examiner—Jerry Smith
Assistant Examiner—Robert W. Beausoliel
Attorney, Agent, or Firm—Lawrence D. Cutter

[57] ABSTRACT

Phase enhancement means are employed in conjunction with linear feedback shift registers to generate sequences of binary pattern vectors which are much more structurally independent of one another thus enabling more thorough and comprehensive testing of integrated circuit systems. More particularly, the present invention employs a plurality of exclusive-OR gates in an array of one gate per register output cell to generate the desired uncorrelated pattern strings. This facilitates testing of integrated circuit devices and systems and is particularly useful for built-in test situations for very large scale integrated circuits which employ pseudorandom test methods.

13 Claims, 4 Drawing Sheets

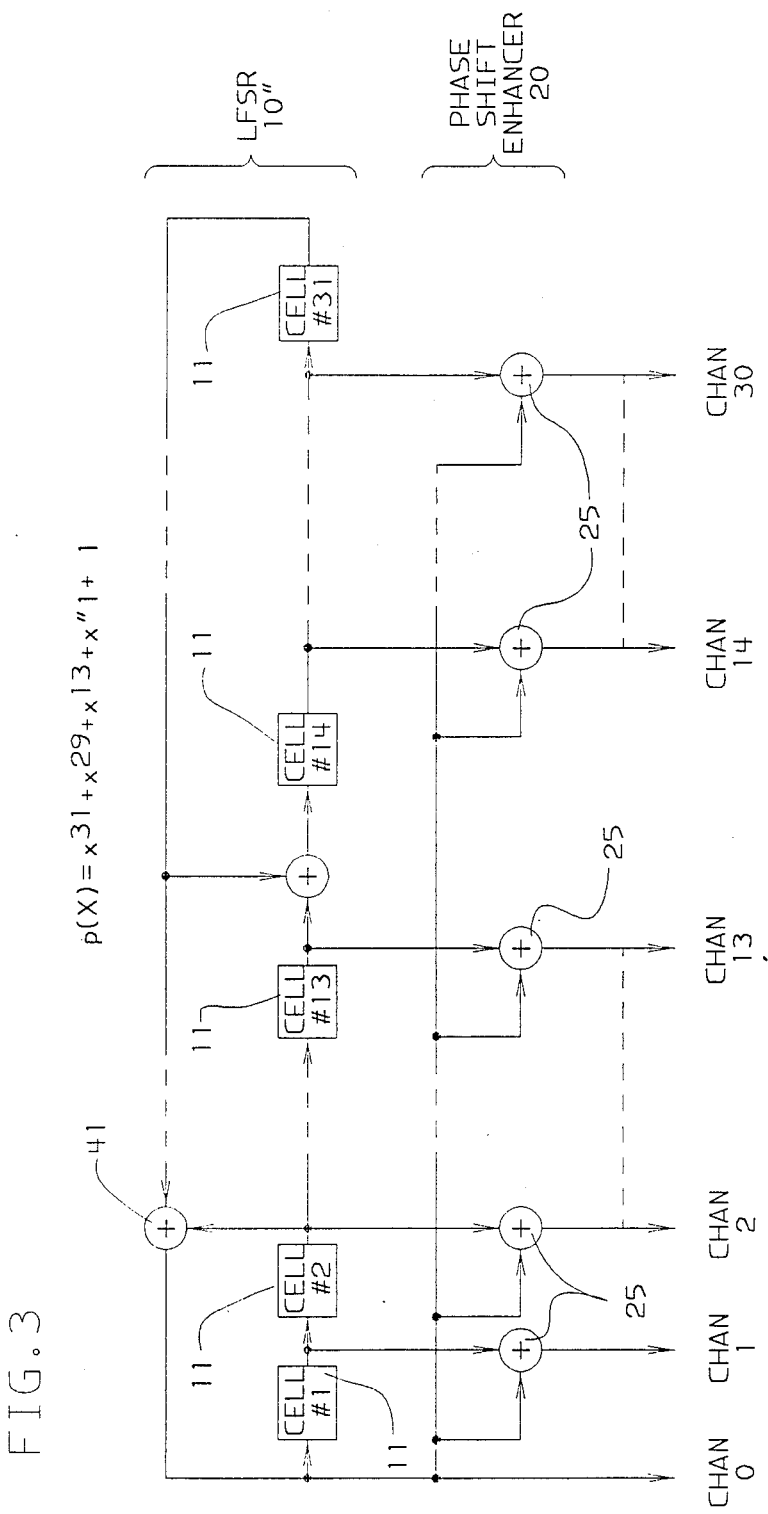

PARALLEL PSEUDORANDOM PATTERN GENERATOR WITH VARYING PHASE SHIFT

BACKGROUND OF THE INVENTION

The present invention is generally directed to pseudorandom pattern generators using linear feedback shift registers. More particularly, the present invention is directed to means and a method for varying the phase shift between adjacent output lines of shift register cells. The invention is particularly useful in generating test patterns for complex integrated circuit logic configurations.

Because of the increased complexity and density of integrated circuit chips and chip configurations, it is becoming increasingly important to be able to adequately test these circuits and their logical functions. The tests contemplated herein may in fact be carried out prior to certification of various chip components or may be carried out in the field, especially during field diagnostic operations.

Because combinatorial and sequential logic circuits have increased in complexity, the number of signal inputs supplied to these circuits has risen correspondingly. As a result of this increase, it often becomes impossible, or at least certainly impractical, to exhaustively test all of the different signal input patterns that could be applied to a circuit. While it is sometimes possible to break down the testing problem so as to reduce the number of inputs, this is not always possible nor may it be completely desirable in all circumstances. Accordingly, an alternate approach to testing has the generation of random test vectors or patterns which are applied to certain input test lines.

One of the methods for generating such test vectors involves the utilization of linear feedback shift registers (LFSRs). In general, linear feedback shift registers are well known in the electrical arts, particularly for their role in the design of circuits which implement error correction and detection. Typically LFSRs comprise a sequence of chained data flip-flops, together with appropriate clocking signals for shifting binary data from one shift register cell to the next. Without limitation, and solely for the purposes of illustration, the LFSR can be thought of as shifting binary digits or bits from the left to the right. In LFSRs output signals from one or more data storage cells in a chain are fed back to preceding cells in the chain, that is to cells to the left of the cells from which the output is taken. These feedback connections are generally made through exclusive-OR gates which in actuality implement a modulo 2 addition operation. As a result of the feedback arrangement, the sequence of patterns of 1's and 0's that the shift register cells exhibit is made to be different. In particular, by an appropriate choice of feedback arrangements, it is often possible to cause the linear feedback shift register to cycle through binary representations of the numbers 0 through $2^{n-1}$, where n is the number of cells in the shift register. It is noted however that because of the feedback arrangement, the shift register patterns do not cycle in numeric order but effectively generate a bit pattern representative of a randomly selected one of the integers from 0 through $2^{n-1}$. Accordingly, linear feedback shift registers of the sort just described have played a significant role in the generation of random patterns of binary vectors. It is these patterns of output signals from the shift register cells which may be supplied to complex logic circuitry for the purpose of effecting a testing function.

Fundamental design philosophies for self testing are described in the text "Built-in Test for VLSI Pseudorandom Techniques" by Paul H. Bardell, William H. McAnney and Jacob Savir as published by John Wiley & Sons, Inc., copyright 1987. It is noted that the inventor herein is one of the aforementioned authors. Chapter 2 of this text illustrates both ad hoc design methodologies and structured design methodologies for self testing. In particular, section 2.2 of this text notes that if the values of certain internal registers can be controlled and observed easily, then the generation of test sequences is reduced to a problem of combinatorial logic. This approach offers significant advantages. In particular, built-in test structures are easily constructed and, more importantly, the ground rules for structured designs almost variably result in synchronous logic which has a reduced and well defined timing dependency. In particular, one of the structured design techniques which is especially relevant to the present invention is the level sensitive scan design (LSSD) methodology. This enables separation of combinational logic and storage elements for test purposes. The shift register latch (SRL) storage elements in this arrangement then become pseudo-inputs for the purpose of test application and pseudo-outputs for the purpose of test observation.

When linear feedback shift registers are employed as parallel sequence pattern generators, the most natural implementation of LSSD is one in which the output from each storage cell of the shift register set is fed into one of many scan paths. In this method, the LFSR shifting clocks and the scan path shifting clocks are the same. This direct implementation results in an array of pseudorandom bits that unfortunately has a structural dependency. If adjacent scan paths are provided with input signals from contiguous shift register stages, the same values appear in adjacent scan paths but off-set by one shift. In particular, if a $2 \times 2$ window is placed anywhere on the array formed by the scan paths, only one-half of the possible $2 \times 2$ binary arrays appear as the linear feedback shift register passes through its cycle. If a $3 \times 3$ window is considered, only one-fourth of the possible binary arrays appear. Larger windows have proportionately smaller coverages. This is a serious problem for built-in test applications which the present invention solves.

It is noted that a simple reassignment of scan latches for the inputs is a solution which is not allowed under the ground rules derived from certain design philosophy considerations. In particular, the sequence generator should be one such that reassignment is not necessary to insure adequate coverage of the pseudorandom pattern set. Thus something more than a simple linear feedback shift register with parallel output feed is required as a suitable sequence generator. It is this problem which the present invention seeks to solve.

The method and apparatus of the present invention are therefore seen to be generally applicable to the generation of uncorrelated parallel test vector sequences for diagnosing physical and functional problems in both combinatorial and sequential logic circuits. Furthermore, the present invention is generally applicable not only to off chip testing, but is particularly applicable to built-in testing in which the circuitry of the present invention is incorporated on a chip along with the circuitry which is being tested.

SUMMARY OF THE INVENTION

In accordance with one embodiment of the present invention a pseudorandom pattern generator comprises a linear feedback shift register means with a plurality of data storage cells for storing and for sequentially shifting data patterns. Each of these cells possesses input and output signal lines. The cells are connected in a feedback arrangement so that collectively, the cells are capable of being cycled through a pattern sequence determined by the feedback arrangement. Additionally, and most importantly with respect to the present invention, phase shift enhancement means are provided for increasing the phase shift between adjacent cell output lines. More particularly, the present invention employs a plurality of exclusive-OR gates each of which receives one input from a distinct shift register cell output line. A second input is also provided to all of these exclusive-OR gates from a common one of the shift register cell input lines. In this way adjacent cell outputs are strongly shifted away from one another in phase and accordingly are capable of providing significantly less structural dependency between adjacent lines. This means that much better test vector sequences are provided. Correspondingly, the present invention provides a method for increasing the phase shift between adjacent parallel output lines of a linear feedback shift register through the employment of the above described plurality of exclusive-OR gates. Furthermore, the present invention is best practiced utilizing linear feedback shift registers exhibiting characteristic or generating polynomials which produce maximal length sequences. Additionally, another embodiment of the present invention employs linear feedback shift registers which are associated with generating polynomials with a minimum number of non-zero coefficients. These coefficients are preferably distributed in the form of a single high order term and two or four non-zero low order coefficients. Such generating polynomials are associated with shift registers having a minimum number of exclusive-OR gates in their feedback arrangements.

Accordingly, it is an object of the present invention to provide an apparatus and method for built-in testing of VLSI circuitry.

It is yet another object of the present invention to provide a method and apparatus for enhancing the phase shift between adjacent cell output lines from a linear feedback shift register.

It is still another object of the present invention to improve level-sensitive scan design methods for built-in test situations.

It is a still further object of the present invention to enhance the reliability of complex integrated circuit systems and components.

It is also an object of the present invention to provide a means for manufacture and field diagnostic testing of complex integrated circuit systems and components.

Lastly, but not limited hereto, it is an object of the present invention to provide a method and apparatus for phase shifting outputs from the cells of a variety of different linear feedback shift register circuits.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may be best understood by reference to the following description taken in connection with the accompanying drawings in which:

FIG. 3 is a schematic diagram illustrating another variation of a linear feedback shift register particularly known as the Wang-McCluskey form.

DETAILED DESCRIPTION OF THE INVENTION

Figure 1:
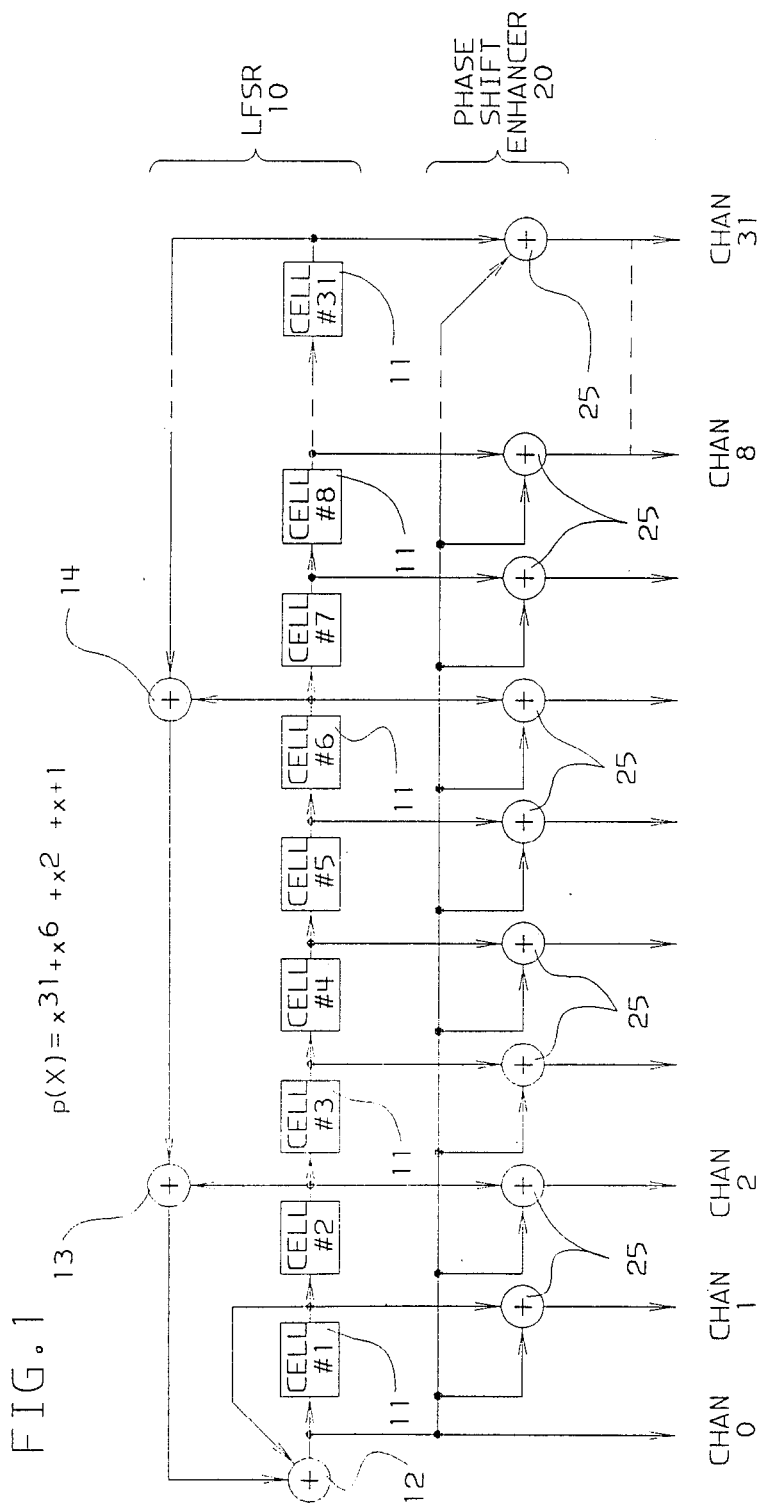
FIG. 1 is a schematic diagram illustrating one embodiment of the present invention.

For purposes of understanding the objects and function of the present invention, it is desirable to fully understand some of the terminology that is employed herein. In particular, as used herein and in the appended claims, "phase shift" is defined as the number of shifts required to move a marker in a sequence from one output to another output in a feedback shift register Additionally, the term "cyclable" means capable of being cycled through a sequence of states. Furthermore, in many forms of linear feedback shift registers the structure is defined in terms of binary signals fed back to a modulo 2 summing node whose output is supplied to the left end of the shift register It is noted however that the term "feedback arrangement" refers herein not only to this LFSR structure but also to structures employing sequences of exclusive-OR gates in the feedback path to perform the modulo 2 summation. Such an arrangement is seen in FIG. 1, and is more particularly described below. Additionally, the term "feedback arrangement" refers to feedback shift register configurations in which binary signals are fed back from shift register cell output signal lines to intermediate points in the chain of shift register cells. Such an arrangement is for example shown in FIGS. 2A and 2B. Also, it is understood, both herein and in the art, that the term "exclusive-OR" gate is typically implemented as a combination of other gates and may not be a single gate per se. Thus with a more precise understanding of the terms employed herein, a more detailed description of applicants' invention is now provided.

FIG. 1 illustrates one preferred embodiment of the present invention. In particular, FIG. 1 illustrates the utilization of phase shift enhancer means 20 in conjunction with linear feedback shift register 10. Shift register 10 comprises a plurality of cells 11 each of which is capable of storing a single bit of information. Each of the 31 cells shown is also capable of receiving single bit signals from the left, and outputting single bit signals to the right. Typically, cell #1 through cell #31 each comprise a clocked data flip-flop or similar arrangement such as a configuration which includes a master and slave flip-flop to insure accurate state transitions. Selected signal lines from the outputs of certain cells (cell #1, for example) are summed modulo 2 (that is, they are exclusive-ORed) and fed back to the input of cell #1. In particular, for the LFSR shown in FIG. 1 the output from cell #6 and cell #31 are added together in this fashion by exclusive-OR gate 14 whose output is passed on to exclusive-OR gate 13 which serves to add thereto (again in a modulo 2 fashion) the output from cell #2. In a like fashion, the output from exclusive-OR gate 13 is supplied to exclusive-OR gate 12, together with the output from cell #1 to produce a grand modulo 2 summation which is supplied as an input to cell #1, as shown. Other shift registers and feedback arrangements, as discussed below, are capable of performing this same function. While it is desirable for LFSRs to produce the full range of distinct output patterns, it is noted that this feature is not essential for the practice of the present invention.

With specific reference to the present invention, attention is now directed to the configuration employed for phase shift enhancer 20. In particular, it is seen that enhancement means 20 comprises a plurality of exclusive-OR gates 25 each of which receives a single input from an output of one of the 31 shift register cells 11. Additionally, each exclusive-OR gate (modulo 2 summer) receives a single selected common input. In preferred embodiments of the present invention, this input to phase shift enhancer 20 comes from the input to the left most shift register cell, that is cell #1, as shown. It is noted however that any cell input line could serve as the common bus in enhancer 20. By employing such a configuration, which does not involve a shuffling, recombination or relabeling of the shift register cell output lines, it is seen that the sequence at channel 2 is 214,380,249 shifts behind the pattern of channel 0. In fact, it is seen that, for all of the new output lines, the phase shift with respect to channel 0 is significantly increased. The improvement in phase shift for all channels is illustrated in TABLE I below for the system shown in FIG. 1 which implements the polynomial $p(k) = x^{31} + x^6 + x^2 + x + 1$:

TABLE I

| $p(x) = x^{31} + x^6 + x^2 + x + 1$ | |
|---|---|
| Channel | Phaseshift |
| 0 | 0 |
| 1 | 1,180,931,948 |
| 2 | 214,380,249 |
| 3 | 1,603,415,683 |
| 4 | 428,760,498 |
| 5 | 1,061,819,806 |
| 6 | 1,059,347,719 |
| 7 | 1,777,005,806 |
| 8 | 857,520,996 |
| 9 | 2,145,813,156 |
| 10 | 2,123,639,612 |
| 11 | 1,606,034,527 |
| 12 | 2,118,695,438 |
| 13 | 103,721,859 |
| 14 | 1,406,527,905 |
| 15 | 629,883,712 |
| 16 | 1,715,041,992 |
| 17 | 1,591,157,952 |
| 18 | 2,144,142,665 |
| 19 | 1,578,710,952 |
| 20 | 2,099,795,577 |
| 21 | 632,305,978 |
| 22 | 1,064,585,407 |
| 23 | 1,034,749,692 |
| 24 | 2,089,907,229 |
| 25 | 422,483,729 |
| 26 | 207,443,718 |
| 27 | 1,731,122,589 |
| 28 | 665,572,283 |
| 29 | 330,908,314 |
| 30 | 1,259,767,424 |
| 31 | 1,462,415,705 |

From the table above, it is apparent that there is an excellent distribution of phase shift over the various channels. It is further seen that the network proposed herein provides a circuit having very few gates in its implementation.

Figure 2A:
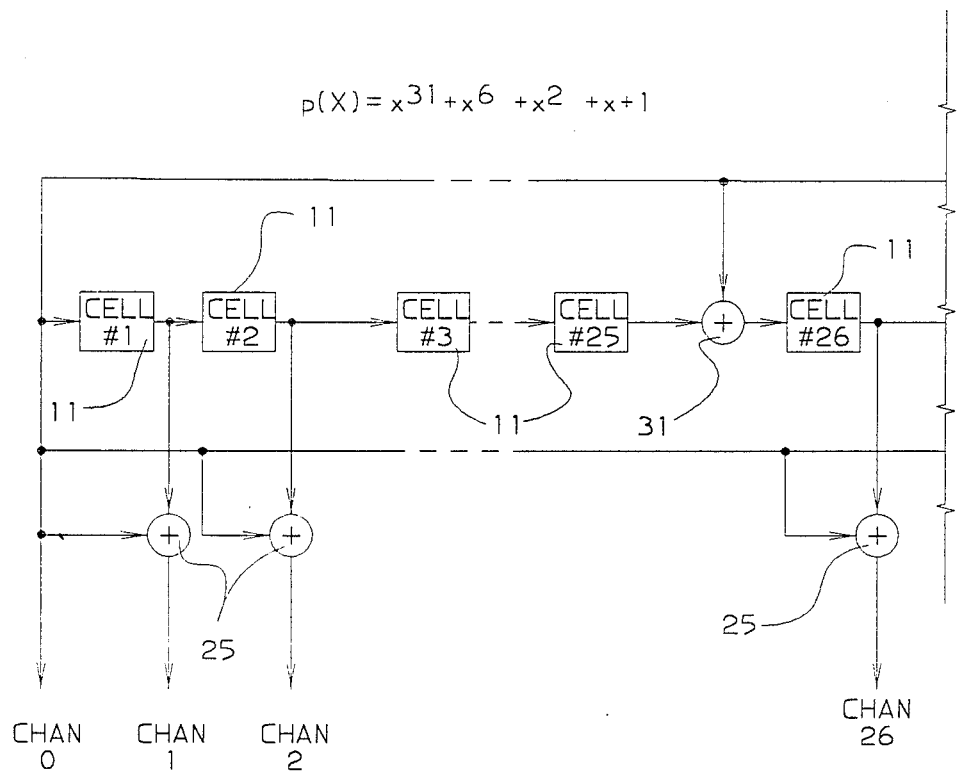
FIGS. 2A and 2B (collectively FIG. 2) are schematic diagrams illustrating another embodiment of the present invention and particularly illustrating an embodiment which employs a linear feedback shift register variation known as a divider implementation.
Figure 2B:
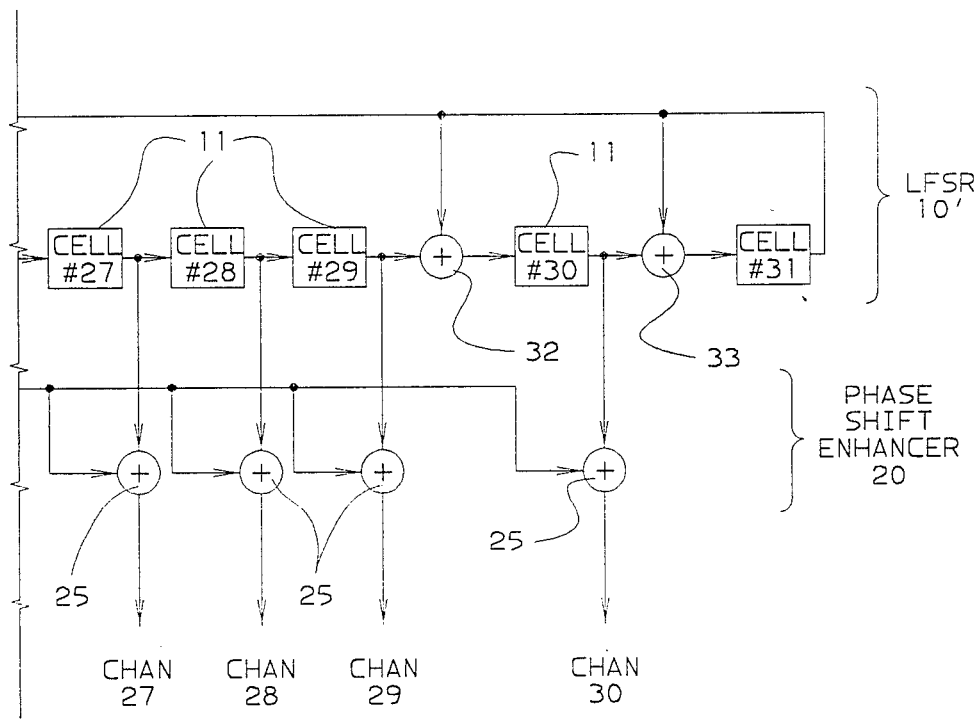

Because of circuit delay considerations, a designer may wish to use a divider implementation of a varying phase shift pseudorandom pattern generator. Such a circuit is shown in FIGS. 2A and 2B, which together comprise single FIG. 2 which is too large for a single drawing sheet. It should be further noted that FIG. 2 illustrates a different but perfectly usable version 10' of a linear feedback shift register. In particular, it is noted that the output from the rightmost cell, cell #31, is fed back to modulo 2 summers 31, 32 and 33 in addition to being fed back as an input to cell #1. It is further seen that modulo 2 summer 31 is disposed between cell #25 and cell #26 as shown. Likewise, modulo 2 summer 32 is disposed between cell #29 and cell #30 as shown; and modulo 2 summer 33 is disposed between cell #30 and cell #31 as shown. This is a divider implementation of a linear feedback shift register, again implementing the polynomial $p(k) = x^{31} + x^6 + x^2 + x + 1$.

However, it is noted that phase shift enhancement means 20 is structured in the same manner as shown in FIG. 1. In the implementation shown in FIG. 2, the phase shift between channels however is somewhat more complex. The phase shift for channels 0 through 25 is identical in both the circuit in FIG. 1 and FIG. 2 but requires a different calculation for channels 26 through 31. It is observed that the output of cell #26 of the LFSR of FIG. 2 is the shifted result of the modulo 2 sum of $x^{25}$ and $x^0$. Thus, the output of cell #26 is $x^Q = 1 + x + x^{26}$. Q can be thought of as the discrete logarithm of the polynomial $f(x) = x^{26} + x + 1$, mod $p(x)$, where $p(x)$ is the characteristic polynomial of the LFSR. Alternatively, $Q = \log(x^{26} + x + 1)$. Thus in order to determine the phase shift Q, it is necessary to calculate:

anti-log($x^{26} + x + 1$) mod($x^{31} + x^6 + x^2 + x + 1$).

The resultant phase shift for the outputs from cell #26 through cell #30 of FIG. 2 are shown in TABLE II below:

TABLE II

| | |
|---|---|
| Channel 26 phase shift = $\log(1 + x + x^{26})$ | = 1,918,005,780 |
| Channel 27 phase shift = $\log(1 + x^2 + x^{27})$ | = 73,380,266 |
| Channel 28 phase shift = $\log(1 + x^3 + x^{28})$ | = 1,395,312,194 |
| Channel 29 phase shift = $\log(1 + x^4 + x^{29})$ | = 1,180,931,946 |
| Channel 30 phase shift = $\log(1 + x + x^5 + x^{30})$ | = 2,147,483,646 |

As indicated above, phase shift enhancement means for conventional linear feedback shift register forms are implementable in accordance with the present invention. The discussion above also indicates that it is implementable with the divider form of an LFSR. Additionally, it is now indicated that it is also implementable with the Wang-McCluskey form. Such a form 10'' is shown in FIG. 3 for the generating polynomial $p(x) = x^{31} + x^{29} + x^{13} + x^{11} + 1$. In each case (FIGS. 1 through 3), the present invention employs only a single two-way exclusive-OR gate per channel. While the phase shifts between output channels differ, they can be calculated. More particularly, the phase shift polynomials for the implementation illustrated in FIG. 3 is shown in TABLE III below. For example, to find the phase shift of channel 14 one would find Q such that $Q = \log(x^{14} + x^3 + x + 1)$. Similar calculations find the phase shifts of the other channels.

TABLE III

Stage 1 $x + 1$
Stage 2 $x^2 + 1$
Stage 3 $x^3 + 1$

TABLE III-continued

Stage 4 $x^4 + 1$
Stage 5 $x^5 + 1$
Stage 6 $x^6 + 1$
Stage 7 $x^7 + 1$
Stage 8 $x^8 + 1$
Stage 9 $x^9 + 1$
Stage 10 $x^{10} + 1$
Stage 11 $x^{11} + 1$
Stage 12 $x^{12} + 1$
Stage 13 $x^{13} + 1$
Stage 14 $x^{14} + x^3 + x + 1$
Stage 15 $x^{15} + x^4 + x^2 + 1$
Stage 16 $x^{16} + x^5 + x^3 + 1$
Stage 17 $x^{17} + x^6 + x^4 + 1$
Stage 18 $x^{18} + x^7 + x^5 + 1$
Stage 19 $x^{19} + x^8 + x^6 + 1$
Stage 20 $x^{20} + x^9 + x^7 + 1$
Stage 21 $x^{21} + x^{10} + x^8 + 1$
Stage 22 $x^{22} + x^{11} + x^9 + 1$
Stage 23 $x^{23} + x^{12} + x^{10} + 1$
Stage 24 $x^{24} + x^{13} + x^{11} + 1$
Stage 25 $x^{25} + x^{14} + x^{12} + 1 = x^{25} + x^3 + x + 1 + x^{12} + 1 = x^{25} + x^{12} + x^3 + x$
Stage 26 $x^{26} + x^{15} + x^{13} + 1 = x^{26} + x^4 + x^2 + x + x^{13} + 1 = x^{26} + x^{13} + x^4 + x^2 + x + 1$
Stage 27 $x^{27} + x^{16} + x^{14} + 1 = x^{27} + x^5 + x^3 + x^2 + x^3 + x + 1 + 1 = x^{27} + x^5 + x^2 + x$
Stage 28 $x^{28} + x^{17} + x^{15} + 1 = x^{28} + x^6 + x^3 + x^2 + 1$
Stage 29 $x^{29} + x^{18} + x^{16} + 1 = x^{29} + x^7 + x^4 + x^3 + 1$
Stage 30 $x^{30} + x^{19} + x^{17} + 1 = x^{30} + x^8 + x^5 + x^4 + 1$ It is noted that the Wang-McCluskey LFSR shown in FIG. 3 is implementable in the form $p(x) = 1 + x^{11}(1 + x^2)(1 + x^{18})$ It is further noted that in the general design of LFSRs, it is desirable to employ feedback arrangements which produce the maximum number of distinct patterns. Such circuits are associated with characteristic polynomials which are primitive. Such polynomials possess no roots in the field. Here the field is the set of binary numbers 0 and 1 together with the operations of modulo 2 addition and multiplication. In this field, multiplication is implemented by an AND operator and addition is implemented by means of an exclusive-OR operator. (It is noted that, as used herein, the term "field" refers to the mathematical concept of a field.) The number of distinct sequences generated by an LFSR with n stages is $2^n - 1$ if the LFSR has a primitive characteristic polynomial. Also, a selection of every $k^{th}$ bit of such a sequence is called a decimation of the sequence. If k is prime relative to $2^n - 1$, then the decimation is called a "proper decimation". One of the properties of maximal length sequences is that a proper decimation of such a maximal sequence is also a maximal sequence. In the case of a four stage LFSR which is capable of generating a maximal sequence of length of 15, is noted that the prime factors of $2^{4-1} = 15$ are 3 and 5. Thusly, decimation by 5 or 3 are not proper decimations. However, decimation by 7 is proper since the 7 is prime relative to 15.

The effect of shortened sequences by improper decimation is avoided either by choice of the proper number of stages in the pseudorandom pattern generator, or by restricting the number of shifts during a test. One common length for a LFSR as part of a pseudorandom pattern generator is 32. The length of a 32nd degree maximal sequence is about $4 \times 10^9$. While this is a long sequence for use as an acceptance test, it is not long for an in situ burn-in test. Suppose for example that the shift register latch strings (as employed in LSSD test designs) are 80 in length and that the shift period is 100 nanoseconds per stage. One test loop thus takes 8 microseconds, or equivalently, $1.25 \times 10^5$ tests per second are performed. At this rate, it takes 8.9 hours to exhaust the maximal sequence. However, the prime factorization of $2^{32} - 1$ is $3 \times 5 \times 17 \times 257 \times 65537 = 4,294,967,295$. Thus decimation by 80 is not a proper decimation (since 80 is not relatively prime with respect to $2^{32} - 1$) so the tests begin to repeat in 1.8 hours. If the shift is increased to 81, the test sequence lasts 3.0 hours. However, if the shift is 82 a full 8.9 hour test is carried out. If a 31 stage LFSR is used, a full 4.45 hours is obtained with any shift since $2^{31} - 1$ is a prime number. Other numbers of the form $2^n - 1$ that have relatively large prime factors are listed in TABLE IV below.

TABLE IV

| | |
|---|---|
| $2^{31} - 1$ | $= 2147483647$ |
| $2^{41} - 1$ | $= 13367 \times 164511353$ |
| $2^{53} - 1$ | $= 6361 \times 69431 \times 20394401$ |
| $2^{59} - 1$ | $= 179951 \times 3203431780337$ |
| $2^{61} - 1$ | $= 230584300 \times 9213693951$ |
| $2^{67} - 1$ | $= 193707721 \times 761838257287$ |

As indicated above, the implementation of a particular linear feedback shift register depends on the characteristic polynomial that is chosen. For some degrees of polynomials one or more primitive trinomials exist. Trinomials are polynomials with three terms. It is noted that the existence of such trinomials is desirable in that such cases imply physical realizations utilizing only a single feedback tap. The degree 31 is one such instance. There are four 31st degree trinomials (and their reciprocal polynomials are also usable; see the discussion below for the definition of such polynomials). These four are listed in TABLE V below:

TABLE V

| |
|---|
| $p_1(x) = x^{31} + x^3 + 1$ |
| $p_2(x) = x^{31} + x^6 + 1$ |
| $p_3(x) = x^{31} + x^7 + 1$ |
| $p_4(x) = x^{31} + x^{13} + 1$ |

Any of these polynomials may be used to implement a 31 stage LFSR with only a single two-way exclusive-OR. When a primitive trinomial is the characteristic polynomial of the LFSR, there is only one circuit option for the conventional LFSR implementation. If a pentanomial (polynomial with five terms) is chosen as the characteristic polynomial several implementation options present themselves.

It is also noted that other LFSR implementations arise from the use of the reciprocal of the generating polynomial. If polynomial is of maximal length, then so is its reciprocal polynomial. A reciprocal polynomial $p'(x)$ of a given polynomial $p(x)$ is defined as $x^n p(1/x)$, where n is the degree of $p(x)$. Some of these other implementations which are based upon generator polynomial representation are described in the IBM Technical Report TR00.3451 entitled "Minimum Two-way Exclusive-OR Realizations of LFSRs" by P. H. Bardell (May 6, 1987). This report is hereby incorporated herein by reference.

From the above, it should be appreciated that the present invention is usable with a variety of linear feedback shift registers to generate patterned test vector sequences which are structurally independent of one another. It should also be appreciated that the present invention offers significant advantages for built-in random test methodologies used in the manufacture, design and maintenance of very large scale integrated circuit devices and systems. It should also be appreciated that the present invention is readily implementable and requires only one additional gate per output channel. It is also seen that the present invention adds minimally to cost, chip real estate and delay.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A pseudorandom pattern generator comprising:
   linear feedback shift register means having a plurality of cells for storing and sequentially shifting data patterns, each cell having input and output signal lines, said cells being connected in a feedback arrangement so that collectively said cells are cyclable through a pattern sequence determined by said feedback arrangement; and
   phase shift enhancement means for increasing the phase shift between adjacent cell output lines.

2. The pseudorandom pattern generator of claim 1 in which said phase shift enhancement means comprises a plurality of exclusive-OR gates each such gate receiving one input signal from a distinct shift register cell output line and a second input from a common specified one of said shift register cell input lines.

3. The pseudorandom pattern generator of claim 2 in which said common specified one of said cell input lines is the input line to the leftmost cell in said shift register means.

4. The pseudorandom pattern generator of claim 1 in which said linear feedback shift register means is defined by a generating polynomial which is of maximum length.

5. The pseudorandom pattern generator of claim 1 in which said linear feedback shift register means is defined by a generating polynomial which requires a minimum number of exclusive-OR gates in its feedback arrangement.

6. The pseudorandom pattern generator of claim 1 in which said linear feedback shift register means is defined by a generating polynomial of the form $p(x) = x^{31} + x^6 + x^2 + x + 1$.

7. The pseudorandom pattern generator of claim 1 in which said linear feedback shift register means is defined by a generating polynomial of the form $p(x) = x^{31} + x^{29} + x^{13} + x^{11} + 1$.

8. A method for increasing the phase shift between adjacent output lines of a linear feedback shift register having a plurality of cells for storing and sequentially shifting data patterns wherein each cell has input and output signal lines and said cells are connected in a feedback arrangement so that collectively said cells are cyclable through a pattern sequence determined by said feedback arrangement, said method comprising separately supplying signals on the output signal lines of said shift register cells to a plurality of exclusive-OR gates, said exclusive-OR gates also being supplied with a common second input from a specified one of said shift register cell input lines.

9. The method of claim 8 in which said second, common input to said exclusive-OR gates is supplied from the input line to the leftmost cell in said shift register.

10. The method of claim 8 in which said linear feedback shift register is defined by a generating polynomial which is of maximum length.

11. The method of claim 8 in which said linear feedback shift register is defined by a generating polynomial which requires a minimum number of exclusive-OR gates in its feedback arrangement.

12. The method of claim 8 in which said linear feedback shift register is defined by a generating polynomial of the form $p(x) = x^{31} + x^6 + x^2 + x + 1$.

13. The method of claim 8 in which said linear feedback shift register is defined by a generating polynomial of the form $p(x) = x^{31} = x^{29} + x^{13} + x^{11} + 1$.

* * * * *